Nov. 5, 1963  W. W. BEAM  3,109,206
INSULATED SPACE AND ELEMENTS THEREOF
Filed June 25, 1958

INVENTOR.
Walter W. Beam
BY
Owen, McDougall, Williams & Hersh
Attorneys

United States Patent Office 3,109,206
Patented Nov. 5, 1963

3,109,206
INSULATED SPACE AND ELEMENTS THEREOF
Walter W. Beam, Ponca City, Okla., assignor, by mesne assignments, to Conch International Methane Limited, Nassau, Bahamas, a corporation of the Bahamas
Filed June 25, 1958, Ser. No. 744,605
4 Claims. (Cl. 20—4)

This invention relates to the insulation of a space of substantial dimension and to elements for use in the manufacture of same. It relates more particularly to the storage and transportation of a liquid which needs to be maintained at extremely low temperature and to the fabrication of an insulated space in which such cold material can be housed for storage and transportation with a minimum amount of heat loss.

This invention is addressed to an improvement over the invention described and claimed in the copending application of Dosker, Serial No. 646,001, filed March 14, 1957 and entitled "Heat-Insulated Wall and Tank Construction."

In the aforementioned copending application, description is made of the insulation of a large storage space, such as the hold of a ship, for use of the insulated space in the storage and transportation of liquefied natural gas housed in large metal tanks at about atmospheric pressure and at a temperature of about —250° F. The insulation comprises large panels of insulation material (4 feet x 8 feet x 15 inches) formed of inner and outer face plies of hardwood laminates and a thick central section of a highly porous, low density, structurally strong and dimensionally stable wood, such as balsa wood, quippo and the like, or other insulating materials such as a honeycomb core of treated paper or veneer. The panels are capable of being prefabricated on a mass production basis and independently mounted in side-by-side and end-to-end relation to cover the wall and floor defining the storage space to function as an insulating lining about the space.

While other portions of the panel sections adjacent the supporting outer wall will seldom change in temperature to any great degree, the inner portions of the panels adjacent the cold liquid will be subject to relatively wide temperature variations in use. For example, the panels installed at a temperature of about 70–100° F. will be cooled down to about —250° F. when the tanks are filled with the liquefied gas or other cargo which needs to be maintained at extremely low temperature. Similar variations in temperature will take place as the cargo tanks are filled and emptied in normal use. Such changes in temperature will obviously result in relative movements between the panels by reason of the expansions and contractions that will take place to increase and decrease the space between the panels.

It is desirable to block the openings formed between the panels to prevent the penetration or passage of convection currents which would reduce the effectiveness of the insulation. It is desirable to provide a sealing relationship between adjacent panels to protect the supporting wall from the cold liquid which, if the cold penetrates to the walls, might cause the deterioration thereof, especially when formed of steel. Further, it is desirable to provide a sealing relationship which would enable the insulation lining to function as a second line of defense to hold the cold liquid coming in contact with its surface in the event of failure of the metal tanks. The problem of maintaining a continuous block and sealing relation between the panels will obviously be complicated by the relative movements taking place between the panels in use as the tanks are filled and emptied.

In the aforementioned copending Dosker application, a wooden spline is inserted between the linear edges at the inner ends of adjacent panels with a kerf formed in the spline to extend through the central portion thereof from the inner end to a point short of the outer end. Thus the spline is subdivided into sections which are capable of flexure relative to each other by an amount corresponding to the relative movements capable of taking place between the panels. The side walls of the subdivided portions of the spline are adhesively secured to the adjacent side walls of adjacent panels for concurrent movement therewith. Thus the spline is interposed between the panels to provide a block which extends continuously throughout the lengths and widths of the panels.

The sealing relation is effected by means of an expansion strip formed of a fluid-impervious material, such as a glass fiber reinforced plastic, which retains its resiliency at the temperature conditions existing. The sealing strip is positioned to overlie the spline with the edges of the strip lapping over the adjacent surfaces of the adjacent panels for attachment thereto in sealing relation. The central portion of the strip is formed with corrugations or a bulbous portion which is adapted to be received within a recess formed in the end of the spline. The bulbous portion is not bonded to the underlying spline, thereby to enable deformation of the bulbous portion to supply additional width to the expansion strip in the event of contraction of the panels and vice versa.

It is an object of this invention to produce and to provide a method for producing an improvement in an insulated space of large dimension, and it is a related object to produce insulation panels which can be prefabricated on a mass production basis and independently assembled on supporting walls in side-by-side and in end-to-end relation substantially completely to cover the walls as a lining; which embodies means for maintaining a sealing relationship between the panels notwithstanding relative movements between the panels in expansion or contraction thereby to block the openings formed between the panels; which embodies means for maintaining a fluid-tight seal between the panels thereby to enable the insulation to function as a defense against penetration of the cold liquid to the supporting walls, and which embodies means for providing a continuous fluid and vapor-impervious surface to enable use thereof as a primary chamber for housing a cold liquid or, in the alternative, a secondary chamber in which the metal cargo tanks can be located.

These and other objects and advantages of this invention will hereinafter appear and for purposes of illustration, but not of limitation, an embodiment of the invention is shown in the accompanying drawings, in which—

Figure 1:
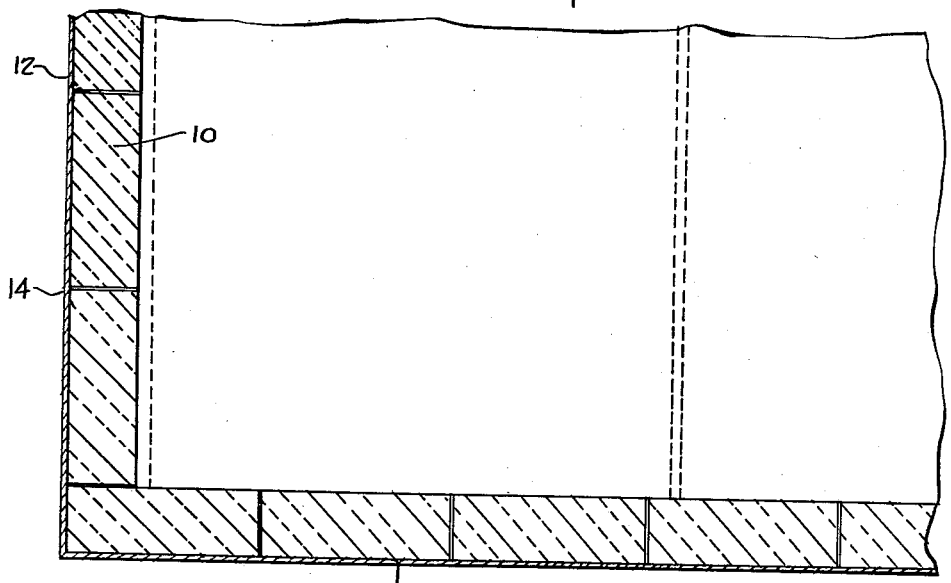
FIGURE 1 is a schematic elevational view partially in section of a fragmentary portion of a storage space embodying the features of this invention.

The concepts of this invention are embodied in the assembly of prefabricated panels 10 of insulation material independently mounted upon a supporting steel wall 12 in side-by-side and in end-to-end relation substantially completely to cover the side walls 14 and the bottom wall 16 defining the storage space, all as described in the aforementioned copending application.

However, in accordance with the practice of this invention, the panels are provided with a metal facing 18 across the inner surface of the panel and in bonding relation with the panel to form an integral part thereof. The metal face ply 18 can be formed of a thin sheet of a metal which is capable of retaining its strength and ductility at the low temperatures to which it will be exposed. For this purpose, the facing sheet can be formed of aluminum, alloys of aluminum, copper, stainless steel or other austenitic steels and, preferably, to a thickness ranging from a few mils up to about ⅛ of an inch, but sheets up to ¼ of an inch or so may be used.

The sheet metal facing 18 can be bonded to the outer facing 20 of the panel prior to assembly of the panel on the supporting wall, as by facing the plywood panel 20 comprising the outer portion of the insulation panel with the metal face ply 18. Instead, the sheet metal facing 18 can be applied after the panel 10 has been mounted on the supporting wall 12. The latter procedure is desirable where the means of attachment demands access to the inner surface of the panel for insertion of attachment means through openings formed in the panel. When other means of attachment are available, as through the outer surface of the supporting wall, it is preferred to join the metal sheet to the panel as an incidence to the fabrication of the panel or the plywood facing 20 on the inner surface thereof.

Thus the panel is provided with a continuous fluid and vapor-impervious surface which provides for more resistance to wear and tear in assembly and use, and which provides a surface for reflecting heat and cold. While the metal face sheet will be characterized by a coefficient of expansion and contraction differing from that of the underlying wooden sections, if the metal sheet is thin enough, the supporting elements will be capable of retaining the forces developed without separations.

The sealing relationship is maintained between adjacent panels by the use of an expansion strip 22 formed of the same metal as the facing sheets 18 or of another metal which is capable of standing up under the cold temperature conditions existing and which is characterized by a flexure and fatigue strength more ably to resist breakdown during repeated deformation or flexure in response to relative movements between the panels in expansion or contraction. The expansion strip 22 comprises an elongate member dimensioned to enable opposite edge portions 24 thereof to overlap the adjacent edge portions of adjacent panels, and the central portion is formed with corrugations, as represented by the bulbous portion 26, extending continuously throughout its length.

Figure 2:
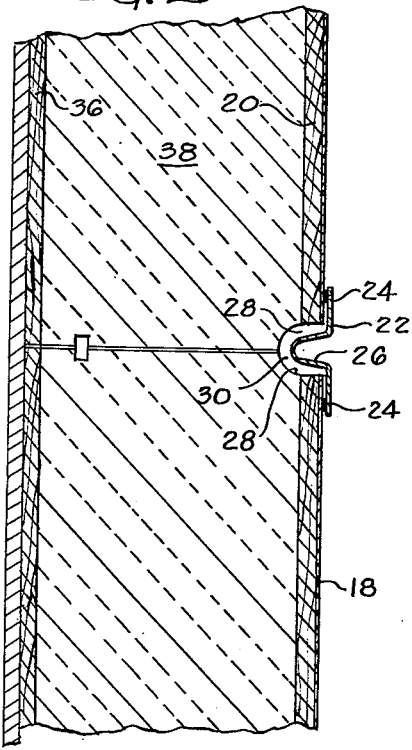
FIGURE 2 is a sectional view illustrating the joint between adjacent panels.
Figure 3:
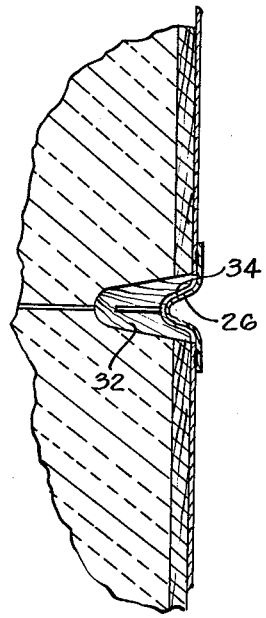
FIGURE 3 is a sectional view similar to that of FIGURE 2 showing a modification in the construction.

The inner edges of the adjacent panels are formed with recesses 28 to provide a continuous opening 30 therebetween in which the bulbous portion can be received in unbonded relation, as illustrated in FIGURE 2. When use is made of a spline 32 for blocking the openings between the panels, as illustrated in FIGURE 3, the outer end of the spline is formed with a continuous recess 34 to enable the bulbous portion 26 to be received therein in unbonded relation. When the bulbous portion extends inwardly into the storage space, it is not necessary to provide an opening between the panels in which the bulbous portion can be disposed.

A continuous and effective seal is capable of being secured between metal members, as represented by the overlapping portions of the metal expansion strip 22 and the underlying metal face ply 18. For this purpose, use can be made of suitable metal joining means, such as welding, brazing, soldering or the like metal forming means to provide a strong and inseparable sealing connection which joins the metal strips and the metal sheets into a continuous surface which is capable, in itself, of functioning as the primary container for housing the cold liquid directly in contact therewith. The major expanse of the metal will be backed by the insulation panels to provide support for the load of liquefied gas. In the alternative, the described insulated space can be used to house one or more metal tanks or containers for the liquid cargo.

The panel sections illustrative of the practice of this invention are formed of inner and outer plywood layers 36 and 20 having a thick, structurally strong, and dimensionally stable intermediate section 38 formed of a good insulating material such as interbonded balsa wood slabs, foamed ceramics, or honeycomb formed of treated paper or corrugated veneers.

Figure 4:
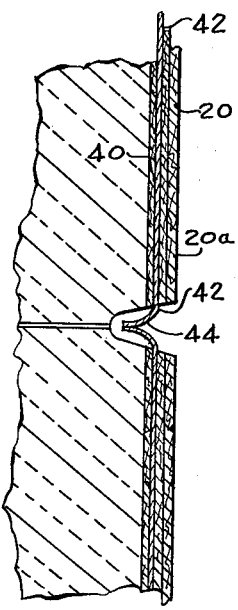
FIGURE 4 is an enlarged sectional elevational view of a modified form of panel construction embodying the features of this invention.

When the panels can be attached to the supporting walls without the necessity to provide openings through the panels, the outer metal facing sheet 18 can be incorporated as an inner ply in the hardwood section 20. Under such circumstances, the outer wooden plies 20ᵃ will function to protect the metal sheet against rupture or deterioration in response to the conditions to which the panel will be exposed in use. As a result, a thinner and more flexible sheet can be employed as an inner ply in the assembly. To effect the desired sealing relationship between metal members capable of joinder by metal joining means, it is desirable to make use of a metal sheet dimensioned to be greater than the length and width of the panel so as to extend beyond the panel and provide an area for attachment, as by welding, to the edges of the expansion strip. In the alternative, if the extension is sufficient, the adjacent edges of the metal sheets may be directly joined one to the other to provide a bulbous portion therebetween to compensate for the expansions and contractions of the insulation panels. This construction is illustrated in the modification shown in FIGURE 4 wherein the metal ply 40 constitutes an inner ply in the plywood panel 20, and wherein the free edges 42 of the metal ply extend outwardly beyond the panel sections for attachment in sealing relation to the free edges of plies in adjacent panels to provide a looped portion 44 therebetween which can operate as an expansion joint.

It has been found that the formation of the expansion strip of a metal member enables attachment to the metal face ply in a manner which insures the maintenance of a continuous and effective sealing relationship between the elements. It has been found further that the metal expansion strip is capable of repeated flexure in response to relative movements between the panels without breakdown in use, thereby to insure the maintenance of a sealing relationship notwithstanding the cycles of expansions and contractions taking place in the elements to which it is attached.

The concepts of this invention are applicable also to the use of a thin film of a fluid and vapor impervious synthetic resinous or elastomeric material bonded as a facing sheet to extend continuously across the panel or else incorporated as a ply in the plywood panel forming the surface. For either purpose, it is desired to make use of a synthetic resinous or elastomeric material which is insoluble in the liquid and which is not attacked by the liquid and which retains its strength and ductility at extremely low temperatures and which embodies the essential characteristics of being fluid impervious. When a plastic or resinous film is employed, it is also desirable to make use of an expansion strip of the same or similar material for enhancing the sealing relationship when joinder is effected between the edges as by conventional sealing techniques, such as joinder by fusion, solvent or the like. Use can be made of such resinous polymers as are formed of the ethylene derivatives, such as polyethylene, polytetrafluoroethylene, and the like, or other film forming resinous materials having the described characteristics, with or without a fibrous reinforcement.

It will be understood that changes may be made in the details of construction, arrangement and operation without departing from the spirit of the invention, especially as defined in the following claims.

I claim:

1. In an insulated space of large dimension for the storage of a material which needs to be maintained at a temperature differing widely from the ambient temperature, supporting walls defining the space to be insulated, a plurality of prefabricated insulation panels each having a continuous metal facing in interbonded relation therewith, means mounting the insulation panels in end-to-end and side-by-side relation on the supporting walls with the metal facing on the surface portion away from the walls to provide a substantially continuous insulation lining on the walls, means joining in sealing relationship the linear edges of the metal facing sheets of adjacent panels with a bulbous portion therebetween to permit relative movements between the panels in expansion and contraction without breaking the sealing relation, and a wooden spline interposed between the linear edges of adjacent panels with the side walls of the spline being adhesively bonded to the adjacent walls of the adjacent panels to interconnect the panels and in which the inner surface of the spline is formed with a recessed portion to receive the bulbous portion of the expansion means in unbonded relationship therein.

2. In an insulated space of large dimension for the storage of a material which needs to be maintained at a temperature differing considerably from the ambient temperature, supporting walls defining the space to be insulated, a plurality of prefabricated insulation panels each having a continuous metal facing in interbonded relation therewith, means mounting the insulation panels in end-to-end and in side-by-side relation on the supporting walls with the metal facing on the surface portion away from the walls to provide a substantially continuous insulation lining on the walls, and means joining in sealing relation the linear edges of the metal facing sheets of adjacent panels with a bulbous portion therebetween to permit relative movements between the panels in expansion and contraction without breaking the sealing relationship, said means for joining the continuous sheets of metal between adjacent panels comprising dimensioning the metal facing sheet to have a length and width greater than the corresponding dimensions of the insulation panel and in which the linear edges of the metal sheet in one panel are joined in sealing relationship to the linear edges of the metal sheets of adjacent panels to provide a sealing connection therebetween and in which the portions of the metal sheets extending beyond the edges of the panels are formed into a bulbous portion to enable the relative movements between the panels in expansion and contraction without breaking the sealing relationship therebetween.

3. An insulated space as claimed in claim 2 in which the linear edges of the inner portions of the panels are recessed to provide an opening between adjacent panels in which the bulbous portion including the joined edges of the metal sheets is received in unbonded relation.

4. In an insulated space of large dimension for the storage of material which needs to be maintained at a temperature differing widely from the ambient temperature, supporting walls defining the space to be insulated, a plurality of prefabricated insulated panels each having a continuous fluid impervious facing sheet in interbonded relationship therewith, means mounting the insulation panels in end-to-end and side-by-side relation on the supporting walls with the facing sheet in the surface portion away from the walls to provide a substantially continuous insulation lining on the walls, means joining the linear edges of the facing sheets of adjacent panels in sealing relationship with a bulbous portion therebetween to permit relative movement between the panels in expansion and contraction without breaking the sealing relationship, and a wooden spline interposed between the linear edges of adjacent panels with the side walls of the spline being adhesively bonded to the adjacent walls of the adjacent panels to interconnect the panels and in which the inner surface of the spline is formed with a recessed portion dimensioned to receive the bulbous portion of the expansion means in unbonded relationship therein.

References Cited in the file of this patent

UNITED STATES PATENTS

| 270,383 | Bugbey | Jan. 9, 1883 |
| 984,541 | Coleman | Feb. 21, 1911 |
| 1,549,290 | Broady | Apr. 11, 1925 |
| 1,549,320 | Lundin | Aug. 11, 1925 |
| 1,626,655 | Woodson | May 3, 1927 |
| 2,091,061 | Waugh | Aug. 24, 1937 |
| 2,299,908 | Leash | Oct. 27, 1942 |
| 2,756,463 | Clements | July 31, 1956 |
| 2,797,448 | Revell | July 2, 1957 |
| 2,834,064 | Clements | May 13, 1958 |
| 2,855,636 | Donnelly | Oct. 14, 1958 |
| 2,983,401 | Murphy | May 9, 1961 |

FOREIGN PATENTS

| 450,555 | Great Britain | July 21, 1936 |